Feb. 3, 1925.
D. R. YARNALL
1,525,113
BLOW-OFF VALVE
Filed Aug. 22, 1922
2 Sheets-Sheet 1
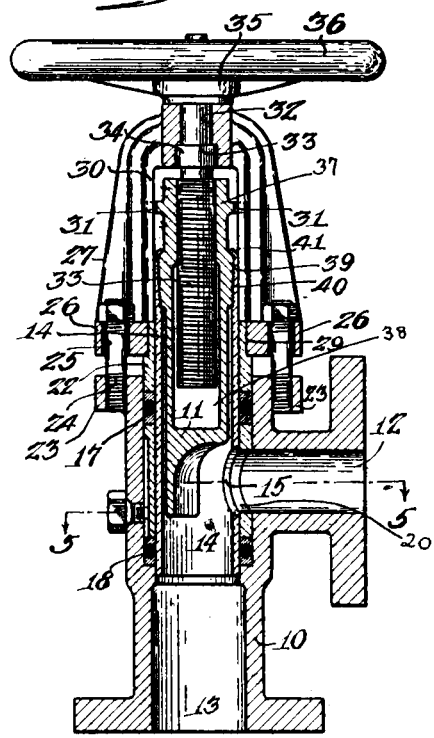
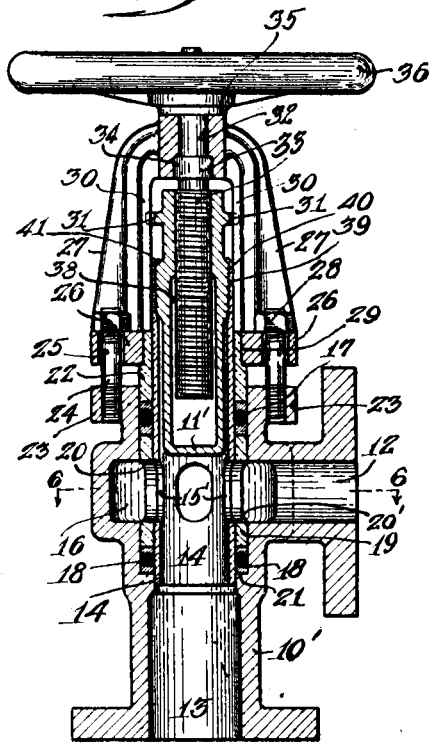
WITNESS:
INVENTOR
David Robert Yarnall.
BY
ATTORNEY

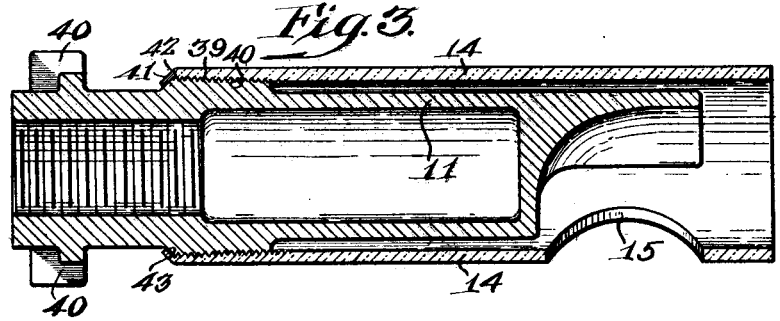
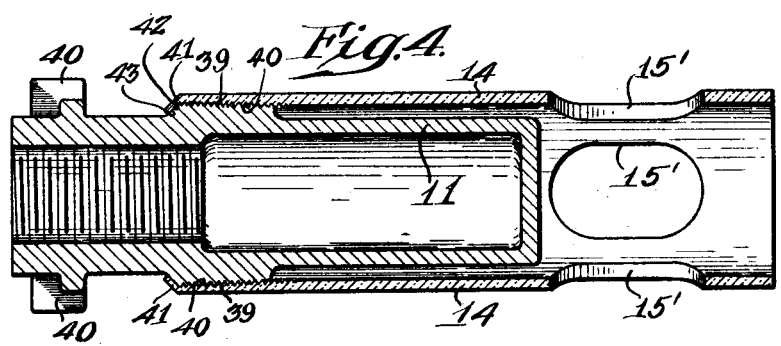
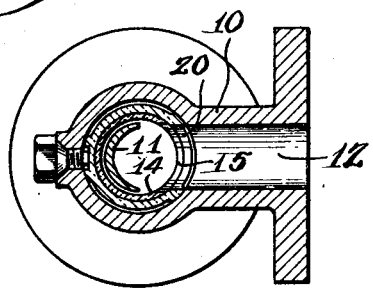
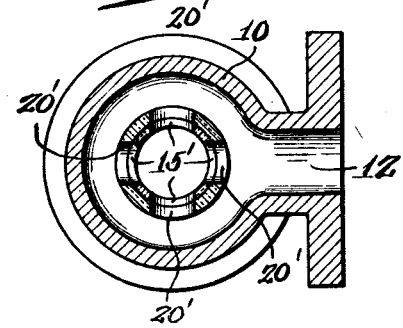

Patented Feb. 3, 1925.

1,525,113

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

BLOW-OFF VALVE.

Application filed August 22, 1922. Serial No. 583,516.

*To all whom it may concern:*

Be it known that I, DAVID ROBERT YARNALL, a citizen of the United States, residing at Philadelphia, in the county of Philadelphia and State of Pennsylvania, have invented a certain new and useful Blow-Off Valve, of which the following is a specification.

My invention relates to blow-off valves intended primarily for high pressure steam work.

The purpose of my invention is to improve the seal between a valve plug and a surrounding sleeve travelling with the plug and effective as the outer surface of the plug.

A further purpose is to reduce the initial cost and weight of a valve plug and to more accurately center it with respect to a sleeve which is to act as the exterior surface of the plug.

Further purposes will appear in the specification and in the claims.

I have preferred to illustrate my invention by but one general form, applied to two slightly different valve plugs, selecting this form because it is practical, efficient and reliable and at the same time well illustrates the principles of my invention.

Figures 1 and 2 are central vertical longitudinal sections of different valve bodies showing slightly different valve plugs.

Figures 3 and 4 are enlarged sections showing the plugs and sleeves in Figures 1 and 2, respectively.

Figures 5 and 6 are sections upon lines 5—5 and 6—6, respectively in Figures 1 and 2.

In the drawings similar numerals indicate like parts.

In my United States Patent No. 1,103,120 of July 14, 1914, I describe an attached valve plug casing in which reliance is placed for the seal upon a wedge-shaped upper clamping member forcing the outer sleeve or shell down against a flange at the lower end of the plug and depending upon the combined seals between the plug and shell or clamp at the top and the flange and shell at the bottom to avoid leakage of fluid between the plug and shell.

Though this served very well for some purposes, it was not wholly satisfactory, both because the seal was not as efficient as with the present invention and because it necessitated carrying the plug down beyond the sleeve or shell to provide the flange for engagement there. I have now found that I can make a better seal between the sleeve or shell and the plug at less cost, more reliably, using the present invention and sealing at the top only, permitting the plug to be shortened and reducing the extent of engagement between the plug and shell. This gives me the advantage of casting the plug without the need of accuracy required with other valve plugs and without the penalties of excessive length and poorer sealing engagment in the form of my patent above noted.

Without attempting to illustrate all the different types of valve bodies and forms of plug to which my invention is suited, I have illustrated two of each for the purpose of indicating that the invention is not confined to any specific form of either. I show valve bodies 10 and 10' in Figures 1 and 2 and plugs 11 and 11' in these figures and in Figures 3 and 4. The inlets to the valve bodies are shown at 12 and the outlets at 13.

In Figure 1 the sleeve 14 is provided with a single inlet opening 15 whereas the sleeve 14' in Figure 2 has a plurality of such openings 15' communicating with an annular chamber 16 at this point for quicker and more full fluid communication between inlet and outlet through this sleeve. Both sleeves slide within packing at 17 and 18 on opposite sides of a central lining member 19 apertured at 20 and 20', respectively. The lower packing rests upon a shoulder 21 and the upper packing is compressed by a collar 22, so as to seal the lining member against leakage at top and bottom and also to seal the sleeve 14 against the packing above and below the openings 15 or 15'.

The upper parts of both valve bodies are flanged at 23 to receive studs 24. These studs pass through holes 25 in flanges 26 upon yokes 27. The studs are held by nuts 28. Each yoke is mounted upon the reduced upper end 29 of the collar 22 and carries an interior guiding fin 30 for the ear 31 upon the plug 11 or 11'.

By tightening the nuts the packing at 17 and 18 is compressed to take up wear and contraction.

At the upper end each yoke is bored at 32 and counterbored to receive the threaded operating shaft 33, whose collar 34 prevents upward movement of the shaft. Boss 35 upon wheel 36, secured to the shaft, prevents downward movement of the shaft so that the shaft can be turned by the wheel 36 to operate the screw within nuts 37 in the plugs without longitudinal movement of the screw. This provides for reliable lifting and lowering of the plug.

In prior valves where the plugs are intended as seals a great many castings have been spoiled by inaccurate centering of the cores; and in the case of my earlier patent noted an excessively long and heavy plug was needed. Since the plugs herein are not intended to act as seals—except that they must be sealed tight to the sleeves—a considerable saving is effected through not requiring the same accuracy in position of the cored opening 38 within the plug. At the same time the means of sealing to the sleeves does not require a long plug.

The plug shown is surfaced by the sleeve or shell 14 which is secured to the outside of the plug so that the sleeve or shell moves up and down past composite packing at 17, 18.

I seal the sleeve 14 to the plug by threading the plug and sleeve 39 and 40 tightly and rolling the end of the sleeve inwardly at 41 against the edge 42 and preferably against the surface 43. The threading may be nearly leak proof itself by reason of the length of the thread or its tightness, but is greatly assisted in the formation of the leak proof joint by the rolling of the end of the sleeve into engagement with the adjoining surface of the plug.

By this construction it is unnecessary and undesirable to give the plug bearing against the sleeve throughout the length of the plug, thus saving in expense of machining, avoiding danger of machining into the interior cored space, as might otherwise happen through displacement of the core, and facilitating effective liquid seal at this point.

It will be obvious that the disclosure of my invention will suggest to those skilled in the art other ways by which a part or all of the benefit of my invention may be obtained and it is my purpose to include herein all modifications and changes which come within the reasonable spirit and scope of my invention.

Having thus described my invention, what I claim as new and desire to secure by Letters Patent is:—

1. A blow-off valve plug, in combination with an enclosing sleeve therefor engaging the plug at one end of the sleeve only and circumferentially threaded directly thereto so as to make the exterior surface of the sleeve effective as the surface of the plug.

2. A plug for a blow-off valve finished near one end only, in combination with a sleeve therefor threaded at the end into engagement with the finished part of the plug and having the sleeve inwardly turned in position upon the plug close to the threaded portion to assist in the seal against flow of water through the threaded portion.

3. A valve plug for a blow-off valve comprising a longitudinally cored plug having a point intermediate the length of the plug of enlarged diameter as respects the body adjacent this enlarged portion of the plug and a sleeve in threaded engagement with the relatively enlarged portion of the plug and inwardly turned at the end of the threaded portion.

4. A valve plug for blow-off valves comprising a plug and a casing united thereto having threaded engagement with the plug and also rolled into contact therewith.

5. The method of securing a casing to a valve plug which consists in threading the two together and subsequently rolling the casing into contact with the plug adjacent the threaded portion.

DAVID ROBERT YARNALL.